United States Patent [19]

Vahratian et al.

[11] Patent Number: 4,509,389

[45] Date of Patent: Apr. 9, 1985

[54] FOUR SPEED RATIO TRANSAXLE WITH OVERDRIVE

[75] Inventors: Adam Vahratian, Livonia; Roosevelt Maynard, Jr., Birmingham, both of Mich.; Howard L. Croswhite, Thousand Oaks, Calif.; Po-Lung Liang, Livonia, Mich.

[73] Assignee: Ford Motor Company, Dearborn, Mich.

[21] Appl. No.: 447,065

[22] Filed: Dec. 6, 1982

Related U.S. Application Data

[63] Continuation-in-part of Ser. No. 164,869, Jul. 1, 1980, Pat. No. 4,368,649.

[51] Int. Cl.³ .................. F16H 37/08; F16H 47/08; F16H 37/06; F16H 57/10
[52] U.S. Cl. ........................... 74/695; 74/688; 74/705; 74/759
[58] Field of Search .............. 74/759, 758, 695, 694, 74/705, 688, 730

[56] References Cited

U.S. PATENT DOCUMENTS

| 3,339,431 | 9/1967 | Croswhite et al. | 74/688 |
| 3,386,314 | 6/1968 | Stockton | 74/759 |
| 3,473,415 | 10/1969 | Kepner | 74/759 |
| 3,491,621 | 1/1970 | Moan | 74/759 |
| 3,678,784 | 7/1972 | Lemieux | 74/759 |
| 3,687,785 | 7/1972 | Stahlberg | 74/759 |
| 3,701,293 | 10/1972 | Mori et al. | 74/759 |
| 3,705,521 | 12/1972 | Smith | 74/759 |
| 3,824,876 | 7/1974 | Mori et al. | 74/759 |
| 4,086,827 | 5/1978 | Chana | 74/759 |
| 4,143,562 | 3/1979 | Murakami et al. | 74/759 |
| 4,242,924 | 1/1981 | Melhorn et al. | 74/759 |
| 4,304,153 | 12/1981 | Moroto et al. | 74/759 |
| 4,368,649 | 1/1983 | Vahratian et al. | 74/695 |
| 4,408,501 | 10/1983 | Liang et al. | 74/688 |
| 4,417,484 | 11/1983 | Gaus et al. | 74/759 X |
| 4,418,585 | 12/1983 | Pierce | 74/759 |

*Primary Examiner*—Allan D. Hermann
*Assistant Examiner*—Stephen B. Andrews
*Attorney, Agent, or Firm*—Donald J. Harrington; Keith L. Zerschling

[57] ABSTRACT

A transaxle for use in an automotive vehicle driveline having a front wheel drive comprising a torque converter and a compound planetary gear system having two simple planetary gear units adapted to provide four forward driving torque delivery paths, the highest speed ratio torque delivery path being an overdrive, the axis of the converter being located on the crankshaft axis of the vehicle engine and the torque output shaft axis being parallel to the converter axis, and clutch and brake means including overrunning clutches and friction clutches in series relationship for establishing and disestablishing the speed ratios.

4 Claims, 5 Drawing Figures

| Gear | C11 | C12 | C13 | C14 | B1 | B2 | Drive | | Coast | | Ratio |
|---|---|---|---|---|---|---|---|---|---|---|---|
| | | | | | | | OWC1 | OWC2 | OWC1 | OWC2 | |
| 1M | X | | X | | | X | X | | | X | 2.779 |
| 1D | X | | | | | X | X | | O/R | | 2.779 |
| 2 | X | X | | | | X | O/R | | O/R | | 1.512 |
| 3 | X | X | X | | | | | X | X | | 1.000 |
| 4 | | X | X | X | | | | O/R | | O/R | .712 |
| R | X | | X | X | | X | | | | X | 2.474 |

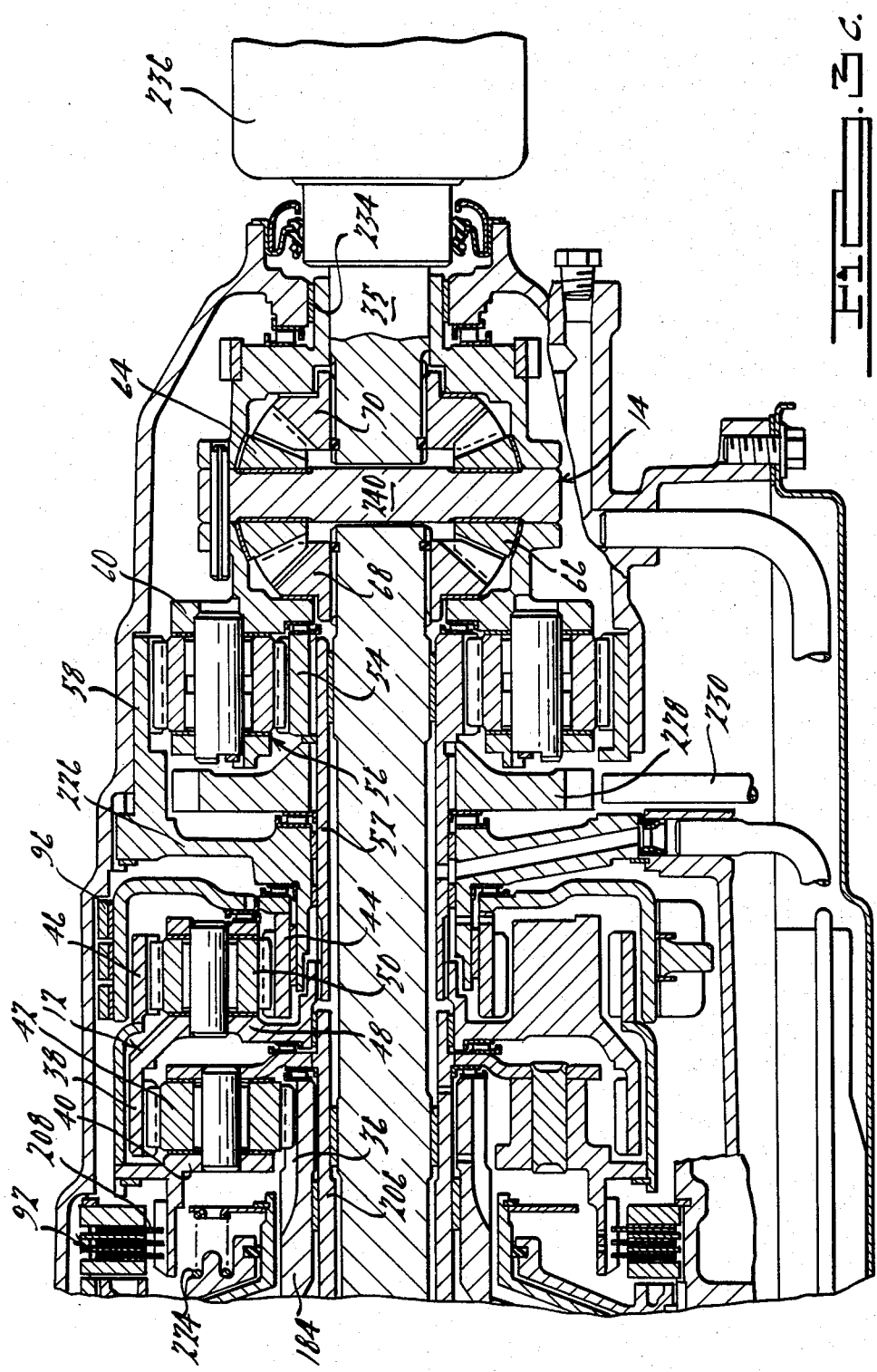

FOUR SPEED RATIO TRANSAXLE WITH OVERDRIVE

REFERENCE TO A RELATED APPLICATION

This application is a continuation-in-part of our application Ser. No. 164,869, filed July 1, 1980, now, U.S. Pat. No. 4,368,649, issued Jan. 18, 1983 titled "Automatic Transaxle Driveline Having Four Forward Driving Ratios and a Single Reverse Ratio". The co-pending application is assigned to the assignee of this invention.

GENERAL DESCRIPTION OF THE INVENTION

Our invention comprises improvements in a four speed ratio power transmission mechanism of the kind shown in co-pending application Ser. No. 164,869, filed July 1, 1980, titled "Automatic Transaxle Driveline Having Four Forward Driving Ratios and a Single Reverse Ratio", now U.S. Pat. No. 4,368,649. That application is assigned to the assignee of this invention.

In our co-pending application we have disclosed a hydrokinetic torque converter situated on the axis of the crankshaft of an internal combustion engine and two simple planetary gear units mounted for rotation about the axis of a driven shaft which extends parallel to the crankshaft axis and concentrically through the gearing. The torque output element of the torque converter, which is the turbine shaft of the bladed turbine, is connected to a drive sprocket for the gearing by means of a chain. Clutches and brakes are used to establish and disestablish four forward driving ratios as well as a reverse ratio.

In the embodiment of our co-pending application a first overrunning coupling and a first friction clutch is used to establish a driving connection between an input sun gear of the gearing and the driven sprocket. A second overrunning coupling and a second friction clutch located in series relationship connect the sun gear to the driven sprocket. The first friction clutch and the second friction clutch each are provided with fluid pressure operated servos the comprise an annular cylinder and a cooperating annular piston which define pressure chambers that rotate about the axis of the gearing. When the chambers are pressurized, the pistons engage friction discs to establish a driving connection between the outer race of the companion overrunning coupling and the common rotary portions of the clutch cylinders.

During operation in the second speed ratio the clutch cylinder for the second friction clutch rotates at a relatively high speed, which is equal to about 1.8 times the speed of the driven sprocket. This creates an undesirable centrifugal pressure build-up in the pressure chamber for the associated clutch servo. This centrifugal pressure build-up is relieved by a ball-and-check valve which opens the pressure chamber to the exhaust region when the clutch is intended to be disengaged. The high rotary speeds of the clutch cylinder, however, cause the centrifugal forces on the ball check valve element to be unduly high thereby making it impossible to pressurize the clutch chamber to effect a ratio change from the second ratio to the third ratio.

The improvements of our invention comprise a novel overrunning clutch and friction clutch arrangement which overcomes the centrifugal force problem that makes calibration of a 2–3 upshift difficult. In our improved arrangement the sun gear, which normally is driven at 1.8 times the input sprocket speed, is not connected to a friction clutch cylinder but rather to the inner race of the associated one-way clutch. The inner races for each clutch are connected to a common member which functions as a torque delivery element for the input sun gear of the planetary gearing. Thus the maximum speed to which the clutch cylinders are subjected is equal to the speed of the driven sprocket thus making it easier to calibrate the ratio changes.

The improved clutch and brake arrangement of our invention makes it possible to achieve a nonsynchronous 3-4 upshift and a nonsynchronous 1-2 upshift although the 2-3 upshift is a synchronous shift that requires disengagement and application of a clutch and a brake in synchronism. The 1-2 nonsynchronous upshift requires only the engagement of the friction clutch and the nonsynchronous 3-4 upshift requires only engagement of a friction brake.

BRIEF DESCRIPTION OF THE FIGURES OF THE DRAWINGS

FIG. 3C is a cross-sectional view of a portion of the transaxle of our invention which includes the planetary gearing, the final drive gearing and the differential gearing.

Figure 3A:
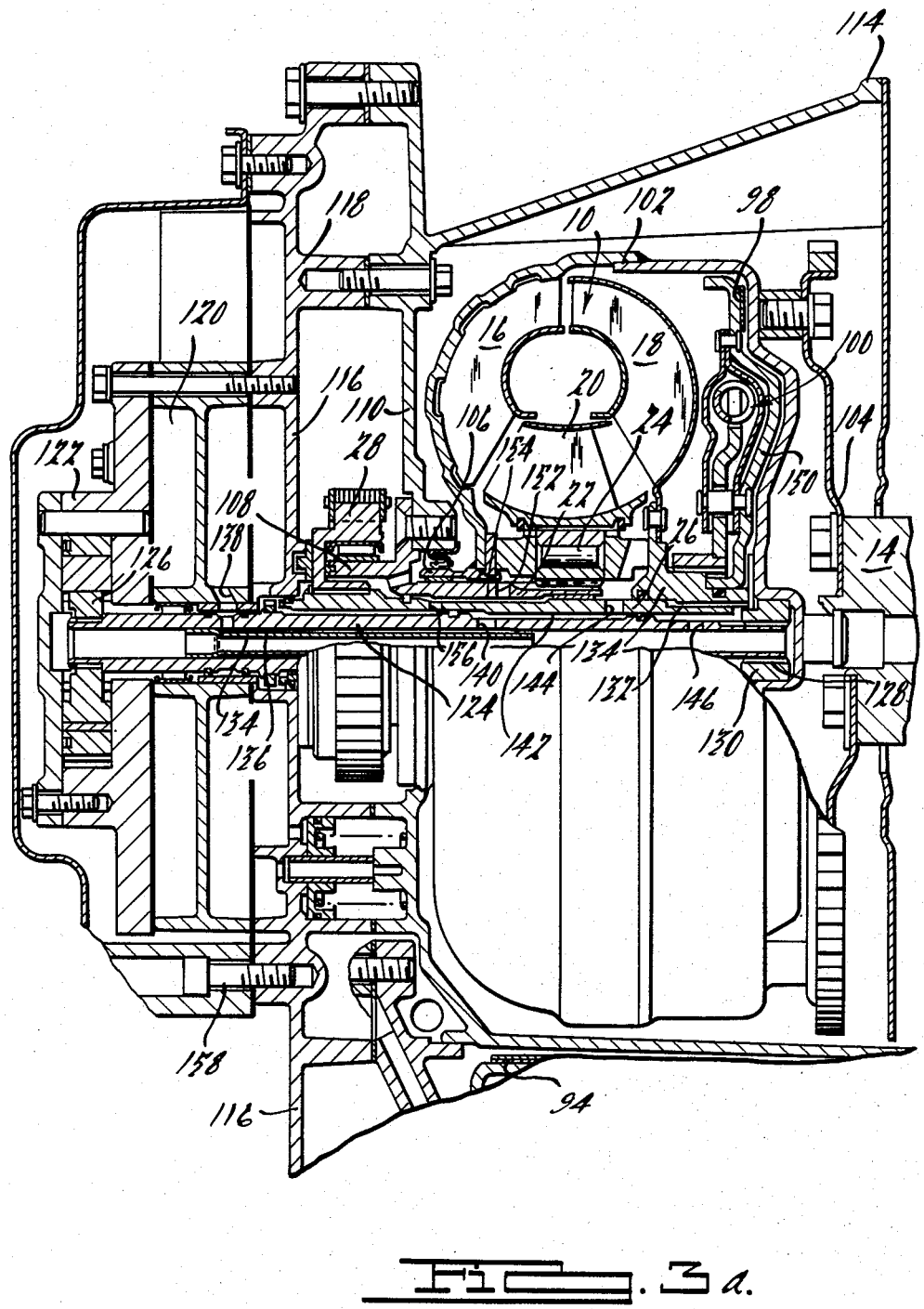
FIG. 3A is a cross-sectional view of a portion of the transaxle of our invention including the hydrokinetic torque converter.
Figure 3B:
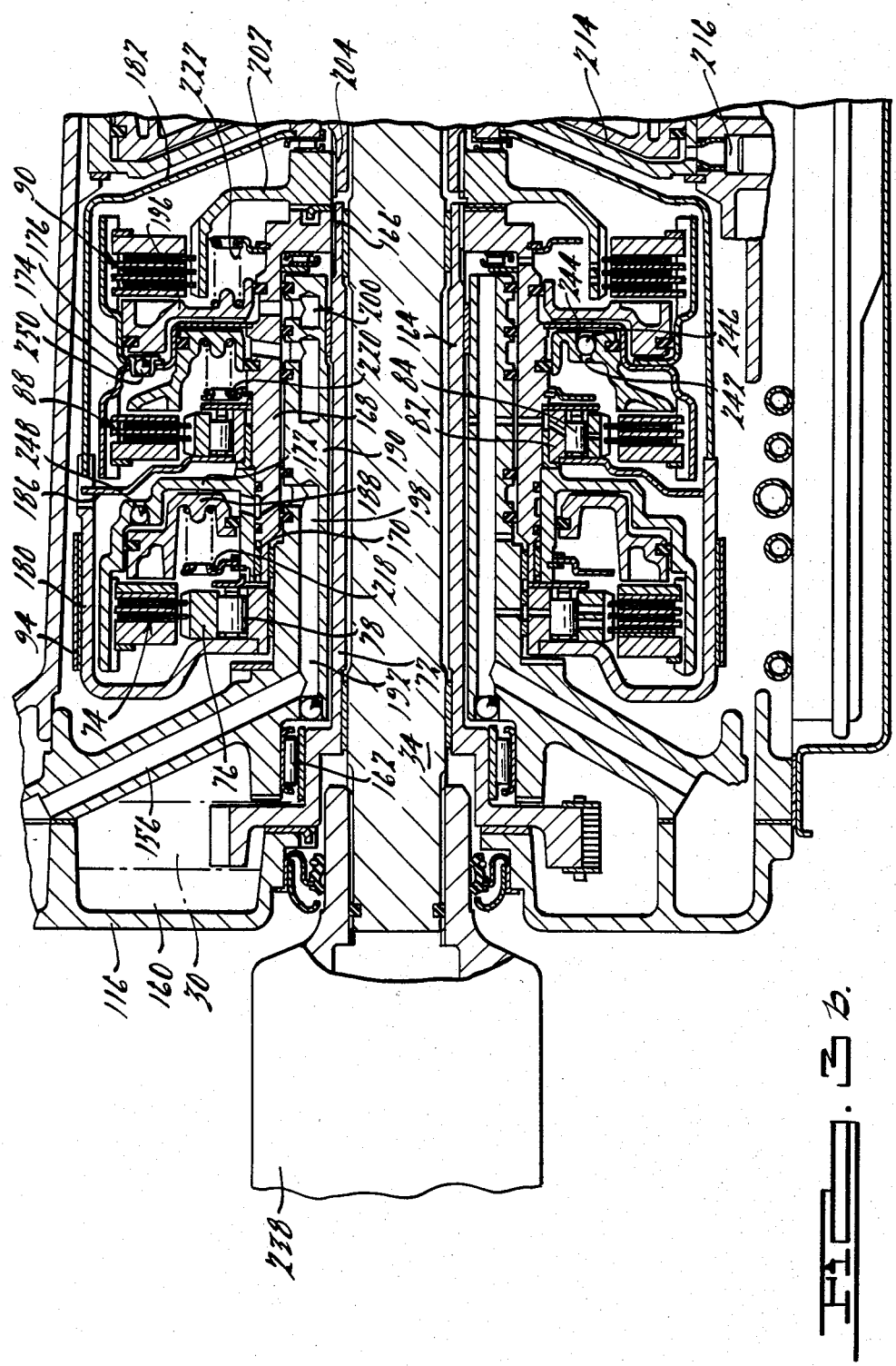
FIG. 3B is a cross-sectional view of a portion of the transaxle of our invention that includes the clutches and brakes.

The views of FIGS. 3A, 3B and 3C taken together represent a cross-sectional view of a single transaxle assembly embodying the improvements of our invention.

PARTICULAR DESCRIPTION OF THE INVENTION

Figures 1, 2:
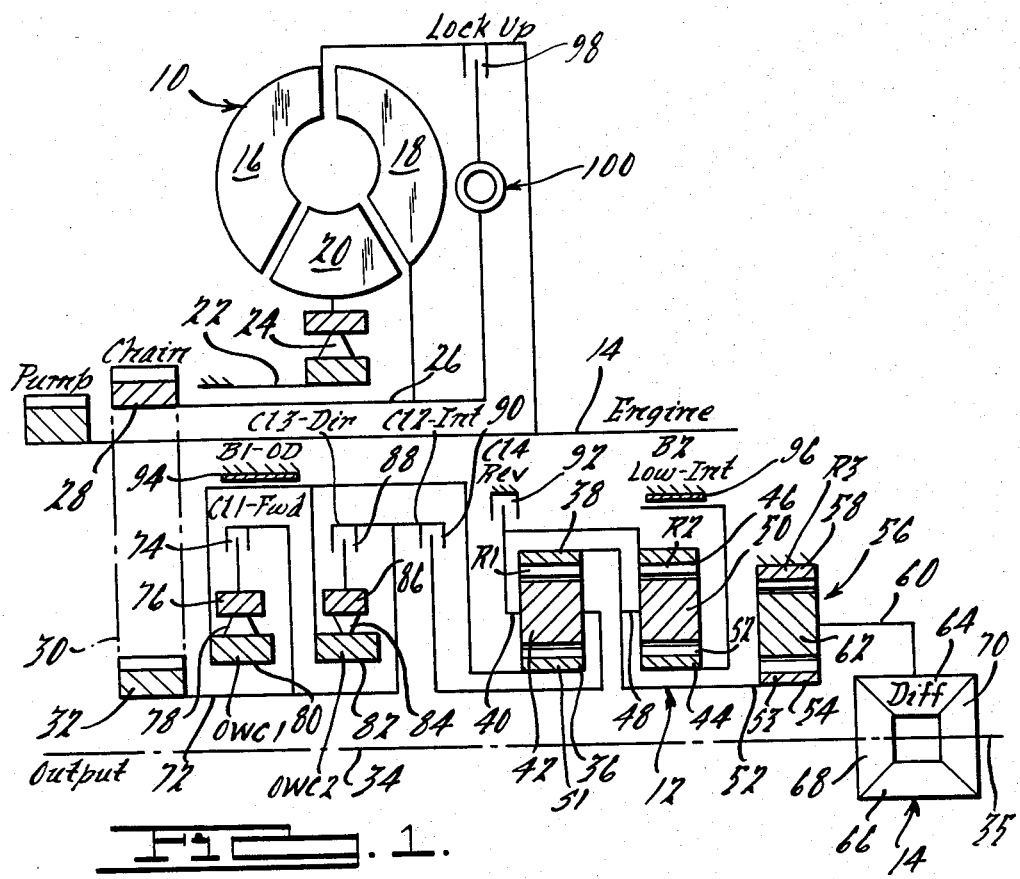
FIG. 1 shows in schematic form torque delivery elements including the planetary gearing for a preferred embodiment of our invention.
FIG. 2 is a chart that shows the pattern of engagement and release of the clutches and brakes to establish the various forward driving ratios and the reverse ratio for the mechanism of FIG. 1.

In FIG. 1 numeral 10 designates the hydrokinetic torque converter. Numeral 12 designates a double planetary gear unit and numeral 14 designates a differential gear unit for transferring output torque from the gearing to the axle shafts.

In FIG. 1 the crankshaft of an internal combustion engine, not shown, has a crankshaft axis 14 which is connected to impeller 16 of the converter 10. A bladed turbine 18 and a bladed stator 20 together with the impeller 16 define a toroidal fluid flow circuit. The stator 20 is supported on a stationary stator sleeve shaft 22 and an overrunning brake 24 anchors the stator to the shaft 22 to prevent rotation of the stator 20 in a direction opposite to the direction of rotation of the impeller although free-wheeling motion in the opposite direction is permitted.

Turbine 18 is connected to turbine sleeve shaft 26 which drives a torque input sprocket 28. The sprocket 28 is a part of a torque transfer drive that includes also drive chain 30 and driven sprocket 32. Sprocket 32 is mounted for rotation about the axis of torque output shaft 34.

Planetary gearing 12 comprises two simple planetary gear units comprising a first gear unit having sun gear 36, ring gear 38, carrier 40 and planetary pinions 42 supported by the carrier 40 in meshing engagement with the sun gear 36 and the ring gear 38. Gearing 12 includes also a second gear unit having a sun gear 44, a ring gear 46, carrier 48 and planet pinions 50 rotatably supported on the carrier 48 in meshing engagement with the sun gear 44 and the ring gear 46. Carrier 40 is connected to ring gear 46, and ring gear 38 is connected to carrier 48 as well as to torque output shaft 52. Torque output shaft 44 is connected to sun gear 54 of final drive gearing which includes a planetary gear unit 56 and the previously mentioned gear unit 14. Gear unit 56 includes, in addition to the sun gear 54, a fixed ring gear 58, a carrier 60 and planet pinions 62 rotatably supported on the carrier 60 in engagement with sun gear 54 and ring gear 58. Carrier 60 is connected to the carrier of the differential gearing 14. This differential gearing has differential pinions 64 and 66 which mesh with differential side gears 68 and 70. Side gear 68 is connected drivably to driven shaft 34, and side gear 70 is connected to driven shaft 35.

Driven sprocket 32 is connected to sleeve shaft 72 which extends to the input side of a forward drive friction clutch 74. This clutch carries also the symbols $CL_1$. The output side of the clutch 74 is connected to the outer race 76 of an overrunning coupling 78 which carries also the symbol $OWC_1$. The inner race of the coupling 78 shown at 80 is connected as shown to sun gear 36 and to the inner race 82 of a second overrunning coupling 84. Overrunning coupling 84 carries also the symbol $OWC_2$.

The outer race 86 of the overrunning coupling 84 is connected to one side of friction clutch 88, which is engaged to establish direct drive. Clutch 88 carries also the symbol $CL_3$. The other side of the clutch 88 is connected to the input side of the friction clutch 90 which is engaged during intermediate speed operation. The other side of the clutch 90 is connected to the carrier 40.

Carrier 40 is adapted to be braked during reverse drive operation by a reverse brake 92. This is a disc type brake having movable and fixed clutch discs, and for this reason it is identified in FIG. 1 as a clutch. It carries the symbol $CL_4$.

Sun gear 36 is adapted to be braked during fourth speed ratio operation, which is an overdrive ratio by a brake band 94 which surrounds a brake drum connected to the overrunning coupling race 80 and sun gear 36. In FIG. 1 brake band 94 carries also the symbol $B_1$.

Sun gear 44 is connected to a brake drum which is adapted to be braked during low speed ratio operation and intermediate speed ratio operation by brake band 96. This brake band carries also the symbol $B_2$. Both the brake band 94 and the brake band 96 are operated by fluid pressure operated brake servos, not shown.

The converter assembly includes a lockup clutch 98 located within the torque converter and impeller housing. The torque output side of the lockup clutch 98 has a damper 100 situated between the impeller and the turbine sleeve shaft 26 so that the engagement of the lockup clutch will not be accompanied by harshness due to transitional torque fluctuations.

FIG. 2 shows a chart indicating the clutches and brakes that are required to be engaged or released for each of the various forward driving ratios and for the reverse ratio. In the chart the symbol X is used to identify n engaged clutch or brake, and the symbol O/R is used to designate an overrunning condition for one or the other of the overrunning couplings 78 and 84.

To establish low speed ratio operation, clutch $CL_1$ is applied as well as brake $B_2$. Turbine torque then is transmitted through the transfer drive chain 30 to the sprocket 32 and through clutch 74 and overrunning coupling 78 to the sun gear 36 with the sun gear 44 acting as a reaction point. An overall torque ratio then is developed which equals 2.779 as indicated in FIG. 2. Under a coast condition with clutch $CL_3$ also applied, overrunning coupling 78 overruns as coasting torque is delivered through the overrunning coupling 84 from the sun gear 36. The coasting condition is shown in the chart of FIG. 2 for the first drive mode 1M. The second drive mode indicates the automatic low speed ratio condition that does not require engagement of clutch $CL_3$.

To effect a ratio change to the intermediate ratio, it merely is necessary to engage one additional clutch while the brake $B_2$ remains applied. The additional clutch is a clutch $CL_2$. Upon engagement of clutch $CL_2$ torque from the sprocket 32 is delivered directly to the carrier to the ring gear 36 through the carrier 40. This produces a speed ratio of 1.512.

The ratio change from the intermediate ratio to third speed direct ratio is a synchronous shift that requires engagement of additional clutch $CL_3$ and release of the brake $B_2$ in timed relationship. Under these conditions drive torque is delivered through the overrunning coupling 82 from the sprocket 32 to sun gear 36. Since torque is delivered simultaneously to the sun gear 36 and the carrier 40, the elements of the planetary gear system are locked together for rotation in unison.

The forth speed ratio is an overdrive ratio. It is accomplished by applying brake $B_1$ and releasing clutch $CL_1$. Actually brake $B_1$ is applied before clutch $CL_1$ is released. The 3–4 shift is a nonsynchronous shift that is achieved merely by engaging the single friction element $B_1$. The overrunning coupling 84 freewheels thus allowing this nonsynchronous shift to occur.

Reverse drive is obtained by engaging clutch $CL_1$, clutch $CL_3$ and brake $CL_4$. Clutch $CL_3$ is used in the reverse drive mode to allow for coast braking in reverse, at which time overrunning coupling 84 is locked while overrunning coupling 78 is idle.

The pattern for engagement and release for the overrunning couplings is indicated in the chart of FIG. 2 for both the drive and coast conditions. FIG. 2 also shows the ratios that are characteristic of each of the drive modes.

The end of the crankshaft 14 as seen in FIG. 3A is connected to the impeller housing 102 by means of a drive plate 104. The turbine 18 and the stator 20 are mounted within the impeller housing 102. An impeller hub 106 is journalled at the left hand side of the impeller housing on stationary stator sleeve shaft 32. A bearing support sleeve 108 for the drive sprocket 28 as well as a stator sleeve shaft 22 are supported by housing wall 110, which forms a part of the transmission casing shown generally at 112. This casing is bolted or otherwise secured at its right hand margin 114 to the internal combustion engine.

Wall 110, together with wall 116 for cover 118, forms cavity for the sprocket 28. A control valve body 120 is secured to the cover 118, and a pump body 122 is secured to the left hand face of the valve body 120. Pump drive shaft 124 extends through turbine sleeve shaft 26 and is splined at its left hand end as seen in FIG. 3A to pump rotor 126. The pump within the pump body 122 is a positive displacement pump and serves as the pressure source for the valve body 120 and for the clutch and brake fluid pressure operated servos that are controlled by the valve elements in the valve body 120.

The right hand end of the pump drive shaft 124 is splined at 128 to the hub 130 of the impeller housing. The right hand end of the turbine shaft 26 is splined at 132 to turbine hub 134.

The interior of the shaft 124 has a flow directing tube 134 which cooperates with the shaft 124 to define an annular flow passage 136 extending from supply port 138 in the control valve body to fluid supply port 140 formed in shaft 26 which supplies the torus circuit for the converter 10 with fluid. A second supply passage is formed in the interior of shaft 124 and supply port 146 extends from the interior of shaft 124 to the space 148 between the inner wall of the converter housing and clutch plate 150 for the clutch 98. When the flow of fluid in that space 148 is in a radial outward direction, the friction surfaces at the radially outward region of the clutch 98 are disengaged so that clutch plate 150 is not frictionally connected to the impeller housing. A flow return port 152 is formed in the sleeve shaft 22 and it communicates through annular passage 154 with port 156 which in turn communicates with the low pressure side of the circuit for the valve body.

If the valve body causes the passage in the interior of the shaft 124 to become depressurized, the space 148 between the clutch plate and the adjacent wall of the impeller housing becomes depressurized and the higher pressure within the torus circuit causes the clutch plate 150 to engage the impeller housing thereby locking the turbine to the impeller and creating a direct drive through the hydrokinetic unit.

The housing portion that encloses the clutches and the planetary gear system as seen in FIGS. 3B and 3C respectively is a part of the housing 112. The left hand end of the housing portion for the clutches and the planetary gear system is closed by an end bearing support wall 156. The end wall 116 extends over the housing portion for the clutches, as seen in FIG. 3B, and is secured in place by bolts 158. Wall 116 and the bearing support wall 156 define a cavity 160 which encloses the drive chain 30 and the sprocket 32. Sprocket 32 is journalled in a bearing opening formed in the wall 156 by means of bearing 162. Sprocket 32 is connected to or joined intergrally with drive sleeve shaft 164 which is splined at 166 to clutch sleeve shaft 168. Shaft 168 is splined at 170 to clutch cylinder 172 and to stamped clutch cylinders 174 and 176.

Cylinder 172 carries externally splined clutch discs for the clutch 74 and internally splined clutch discs of the clutch 74 are splined to outer race 76 for overrunning coupling 78. The inner race 80 of the overrunning coupling 78 is connected to brake drum 180, which in turn is connected through drive shell 182 with sleeve shaft 184 for the sun gear 36. It is connected also through drive plate 186 with the inner race 82 of the overrunning coupling 84.

Cylinder 172 receives an annular piston 188 which cooperates with the cylinder 172 to define a pressure cavity that communicates through ports in the sleeve shaft 168 and the sleeve shaft 190 with pressure supply port 192 which in turn communicates with the valve body. The stamped cylinders 174 and 176 cooperate with annular pistons 194 and 196, respectively. The cylinders and their respective pistons define working pressure chambers that communicate with pressure feed passage 198 and 200 through ports formed in clutch sleeve 168. Cylinder 174 carries externally splined clutch discs and cooperating internally splined clutch discs for the clutch 88 are connected to outer race 86 of the overrunning coupling 84.

Cylinder 176 also carries externally splined clutch discs which register with internally splined clutch discs carried by clutch member 202, which is splined at 204 to sleeve shaft 206 connected to carrier 40.

Carrier 40 carries friction discs 208 which form a part of brake 92. Cooperating friction discs for the brake 92 are carried by the stationary housing. Brake 92 is applied by brake piston 210 which is received in annular cylinder 212 fixed to the housing. Pressurized fluid is distributed to the annular cylinder working space 214 for the brake 92 through port 216, which communicates with the control valve body through an internal passage not shown.

Clutch pistons 188, 194 and 196 and the brake piston 210 each have return springs shown respectively at 218, 220, 222 and 224. The torque output shaft of 52 is journalled in a bearing support wall 226 at the right hand end of the lower portion of the housing as seen in FIG. 3C. A transmission parking gear 228 is splined to the sleeve shaft 52 and is adapted to be engaged by a parking pawl 230.

The planetary gear unit 56 of the final drive gearing has a carrier that is connected to a differential carrier 232 of differential gear unit 14. Carrier 232 is journalled in bearing opening 234 at the right hand end of the lower portion of the housing as seen in FIG. 3C. Output side gear 70 of the differential gear unit 14 is splined to output shaft 35, which in turn is connected at its outboard end by means of a universal joint 236 to one of two axle shafts. Side gear 68 of the differential gearing 14 is splined at the right hand end of shaft 34 and the left hand end of shaft 34 is connected by means of a universal joint 238 to a second axle shaft. Pinions 64 and 66 are supported on pinion shaft 240, which in turn is secured to the carrier 232.

Annular piston 194 of clutch 88 has an exhaust port 242 which communicates with a ball valve cavity 244. The transition from the cavity 244 to the port 242 comprises a tapered conical valve seat that is engaged by a ball valve element 246. Centrifugal force due to the rotation of the clutch 88 tends to move the valve element 246 in a radially outward direction thereby uncovering the port 242. The pressure in the pressure cavity for the clutch 88, however, tends to maintain the valve element 246 seated against the valve seat thus blocking port 242.

The presence of the valve 246 in the port 242 prevents an undesirable centrifugal pressure buildup when the clutch 88 is rotated at a high speed when disengagement of the clutch is desired. That is the condition that would exist during operation in the low speed ratio and the intermediate speed ratio. A similar ball check valve element 248 is provided in piston 172 for the clutch 74. This ball check valve element 248 functions in the manner similar to the mode of operation of the ball check valve element 246 and prevents a centrifugal pressure build up in the pressure chamber for the clutch 74.

A corresponding ball check valve element 250 is provided for the annular cylinder for the rotating clutch 90.

The speed of rotation of the inner race for the overrunning coupling 84 is equal to sun gear speed. The speed of rotation of the annular cylinder of clutch 88 does not equal the sun gear speed since it is effectively disconnected from the sun gear through the overrunning coupling 84. Unlike the design shown in our co-pending application, the annular cylinder for the low third speed ratio and the fourth speed ratio clutch does not rotate at the speed of the sun gear 36, which may be equal to about 1.8 times the speed of sprocket 32. Thus it is possible to avoid a condition where the centrifugal force acting on the ball valve element 246 is too high to permit fluid in the working chamber for the clutch 88 to cause the valve element to seat, which would make it difficult to effect engagement of the clutch 88 during the shift sequence.

The present structure, in contrast to the structure of our co-pending application, has the additional advantage of a reduced rotating mass for the clutch elements thereby improving the overall operating efficiency of the driveline. The bearing speeds for the associated rotary elements are reduced accordingly.

Having described a preferred form of our invention, what we claim and desire to secure by U.S. Letters Patent is:

1. In an automatic transaxle for an automotive vehicle having an engine driven torque input shaft and a driven shaft arranged in offset, parallel relationship;
   a hydrokinetic torque converter having a turbine and an impeller mounted for rotation about the axis of said torque input shaft, a turbine driven shaft driven by said turbine;
   a planetary gear system comprising two simple planetary gear units mounted for rotation about the axis of said driven shaft, each gear unit having a sun gear, a ring gear and a planet pinion carrier, a torque output element of said gear system being connected to the ring gear of the first of said gear units and the carrier of the second of said gear units, the carrier of the first of said gear units being connected to the ring gear of the second of said gear units;
   final drive gearing connecting drivably said torque output element with said driven shaft;
   first, second and third clutch means for delivering torque through said gear system comprising a clutch sleeve shaft driven by said turbine driven shaft, said first clutch means comprising a first overrunning coupling and a first friction clutch in series, said first friction clutch being located between said clutch sleeve shaft and said first overrunning coupling in the torque flow path between said clutch sleeve shaft and the sun gear of said first gear unit, said second clutch means comprising a second friction clutch adapted to connect said sleeve shaft to the carrier of said first gear unit, said third clutch means comprising a second overrunning coupling and a third friction clutch in series, said third friction clutch being located between said clutch sleeve shaft and said second overrunning coupling in the torque flow path between said clutch sleeve shaft and the sun gear of said first gear unit;
   first brake means for braking the sun gear of the first of said gear units, second brake means for braking the sun gear of the second of said gear units and third brake means for braking the carrier of the first of said gear units.

2. In an automatic transaxle for an automotive vehicle having an engine driven torque input shaft and a driven shaft arranged in offset, parallel relationship:
   a hydrokinetic torque converter having a turbine and an impeller mounted for rotation about the axis of said torque input shaft, a turbine shaft driven by said turbine;
   a planetary gear system comprising two simple planetary gear units mounted for rotation about the axis of said driven shaft, each gear unit having a sun gear, a ring gear and a planet pinion carrier, a torque output element of said gear system being connected to the ring gear of the first of said gear units and the carrier of the second of said gear units, the carrier of the first of said gear units being connected to the ring gear of the second of said gear units;
   final drive gearing connecting drivably said torque output element with said driven shaft;
   first, second and third clutch means for delivering torque through said gear system comprising a clutch sleeve shaft, said first clutch means comprising a first overrunning coupling and a first friction clutch in series, driven by said clutch sleeve shaft said first friction clutch being adapted to connect the outer race of said first overrunning clutch to said sleeve shaft, said second clutch means comprising a second friction clutch adapted to connect said sleeve shaft to the carrier of said first gear unit;
   said third clutch means comprising a second overrunning coupling and a third friction clutch in series, said third clutch means being adapted to connect said sleeve shaft to the outer race for said second overrunning coupling, the inner race for each overrunning coupling being connected to the sun gear of the first of said gear units;
   first brake means for braking the sun gear of the first of said gear units, second brake means for braking the sun of the second of said gear units and third brake means for braking the carrier of the first of said gear units.

3. The combination as set forth in claim 1 wherein said transaxle includes a torque transfer drive comprising a drive sprocket connected to said turbine, a driven sprocket connected to said clutch sleeve shaft and a drive chain drivably connecting said drive and driven sprockets.

4. The combination as set forth in claim 2 wherein said transaxle includes a torque transfer drive comprising a drive sprocket connected to said turbine, a driven sprocket connected to said clutch sleeve shaft and a drive chain drivably connecting said drive and driven sprockets.

* * * * *

UNITED STATES PATENT AND TRADEMARK OFFICE
CERTIFICATE OF CORRECTION

PATENT NO. : 4,509,389
DATED : April 9, 1985
INVENTOR(S) : Adam Vahratian et al

It is certified that error appears in the above–identified patent and that said Letters Patent are hereby corrected as shown below:

Column 1, lines 5-12, delete entire paragraph relating to "Reference to a Related Application".

Column 1, line 41, substitute -- that -- for "the".

Column 1, line 54, delete "and".

Column 3, line 45, insert -- , -- after "ratio" (second occurrence).

Signed and Sealed this

Twenty-ninth Day of October 1985

[SEAL]

Attest:

DONALD J. QUIGG

Attesting Officer

Commissioner of Patents and
Trademarks—Designate